(12) United States Patent
Thankachan et al.

(10) Patent No.: US 10,860,400 B2
(45) Date of Patent: Dec. 8, 2020

(54) INTELLIGENT MONITORING AND DIAGNOSTICS FOR APPLICATION SUPPORT

(71) Applicant: EMC IP Holding Company LLC, Hopkinton, MA (US)

(72) Inventors: Karun Thankachan, Cochin (IN); Prajnan Goswami, Guwahati (IN); Mohammad Rafey, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 171 days.

(21) Appl. No.: 16/050,364

(22) Filed: Jul. 31, 2018

(65) Prior Publication Data

US 2020/0042369 A1 Feb. 6, 2020

(51) Int. Cl.
*G06F 11/00* (2006.01)
*G06F 9/448* (2018.01)

(52) U.S. Cl.
CPC .......... *G06F 11/006* (2013.01); *G06F 9/4498* (2018.02); *G06F 2201/805* (2013.01); *G06F 2201/865* (2013.01)

(58) Field of Classification Search
CPC ............... G06F 11/079; G06F 11/0793; G06F 11/0751; G06F 11/0709; G06F 11/366; G06F 11/3688; G06F 11/3664; G06F 11/0778

See application file for complete search history.

(56) References Cited

U.S. PATENT DOCUMENTS

| 5,721,920 A * | 2/1998 | Mak .......................... G06F 8/00 718/102 |
| 7,277,920 B2 * | 10/2007 | Ramesh ................ G06F 9/4498 709/209 |
| 7,810,071 B2 * | 10/2010 | Thebes .................. G06F 11/366 717/124 |
| 8,621,279 B1 * | 12/2013 | Antukh ............... G06F 11/3664 714/26 |
| 9,092,561 B2 * | 7/2015 | Miao .................... G06F 11/3608 |
| 9,110,682 B2 * | 8/2015 | Cao ........................ G06F 9/4498 |
| 9,372,746 B2 * | 6/2016 | Ganesan .............. G06F 11/0706 |
| 10,445,169 B2 * | 10/2019 | Baca ...................... G06F 11/079 |

(Continued)

*Primary Examiner* — Nadeem Iqbal
(74) *Attorney, Agent, or Firm* — Krishnendu Gupta; Lesley Leonessa

(57) ABSTRACT

A method is used in monitoring an application in a computing environment. The method represents execution of the application on a system as a finite state machine. The finite state machine depicts at least one state of the application, where the state indicates at least one of successful application execution and unsuccessful application execution. The method identifies an error state within the finite state machine, where the error state indicates the unsuccessful application execution. The method identifies, by analyzing the finite state machine, a non-error state as a cause of the unsuccessful application execution, where the unsuccessful application execution is represented as a path comprising a plurality of states, where the path comprises the non-error state. The method maps the non-error state to a location in the application to identify the cause of the unsuccessful application execution.

20 Claims, 5 Drawing Sheets

(56) References Cited

U.S. PATENT DOCUMENTS

| | | | |
|---|---|---|---|
| 2006/0085681 A1* | 4/2006 | Feldstein | G06F 11/3684 |
| | | | 714/25 |
| 2007/0226546 A1* | 9/2007 | Asthana | G06F 11/008 |
| | | | 714/47.1 |
| 2008/0052680 A1* | 2/2008 | Thebes | G06F 11/366 |
| | | | 717/124 |
| 2008/0126413 A1* | 5/2008 | Addleman | G06F 11/2294 |
| 2014/0229922 A1* | 8/2014 | Valdiviezo Basauri | ...... |
| | | | G06F 11/3608 |
| | | | 717/126 |

* cited by examiner

INTELLIGENT MONITORING AND DIAGNOSTICS FOR APPLICATION SUPPORT

BACKGROUND

Technical Field

This application relates to intelligent monitoring and diagnostics for application support in computing environments.

Description of Related Art

When software applications execute, they may execute successfully, or may fail at some point during the execution. Traditionally, logs have been maintained to track the execution of software application, and provide information such as when, where, and why the application failed. Logs may also provide additional information related to application failures. Logs may provide an enormous amount of information, which may provide necessary information, but the size of the logs may also make it difficult to isolate a cause of an application failure.

SUMMARY OF THE INVENTION

In accordance with one aspect of the invention, a method is used in monitoring an application in a computing environment. The method represents execution of the application on a system as a finite state machine. The finite state machine depicts at least one state of the application, where the state indicates at least one of successful application execution and unsuccessful application execution. The method identifies an error state within the finite state machine, where the error state indicates the unsuccessful application execution. The method identifies, by analyzing the finite state machine, a non-error state as a cause of the unsuccessful application execution, where the unsuccessful application execution is represented as a path comprising a plurality of states, where the path comprises the non-error state. The method maps the non-error state to a location in the application to identify the cause of the unsuccessful application execution.

In accordance with one aspect of the invention, a system is used in monitoring an application in a computing environment. The system represents execution of the application on a system as a finite state machine. The finite state machine depicts at least one state of the application, where the state indicates at least one of successful application execution and unsuccessful application execution. The system identifies an error state within the finite state machine, where the error state indicates the unsuccessful application execution. The system identifies, by analyzing the finite state machine, a non-error state as a cause of the unsuccessful application execution, where the unsuccessful application execution is represented as a path comprising a plurality of states, where the path comprises the non-error state. The system maps the non-error state to a location in the application to identify the cause of the unsuccessful application execution.

In accordance with another aspect of the invention, a computer program product comprising a computer readable medium is encoded with computer executable program code. The code enables execution across one or more processors for monitoring an application in a computing environment. The code represents execution of the application on a system as a finite state machine. The finite state machine depicts at least one state of the application, where the state indicates at least one of successful application execution and unsuccessful application execution. The code identifies an error state within the finite state machine, where the error state indicates the unsuccessful application execution. The code identifies, by analyzing the finite state machine, a non-error state as a cause of the unsuccessful application execution, where the unsuccessful application execution is represented as a path comprising a plurality of states, where the path comprises the non-error state. The code maps the non-error state to a location in the application to identify the cause of the unsuccessful application execution.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
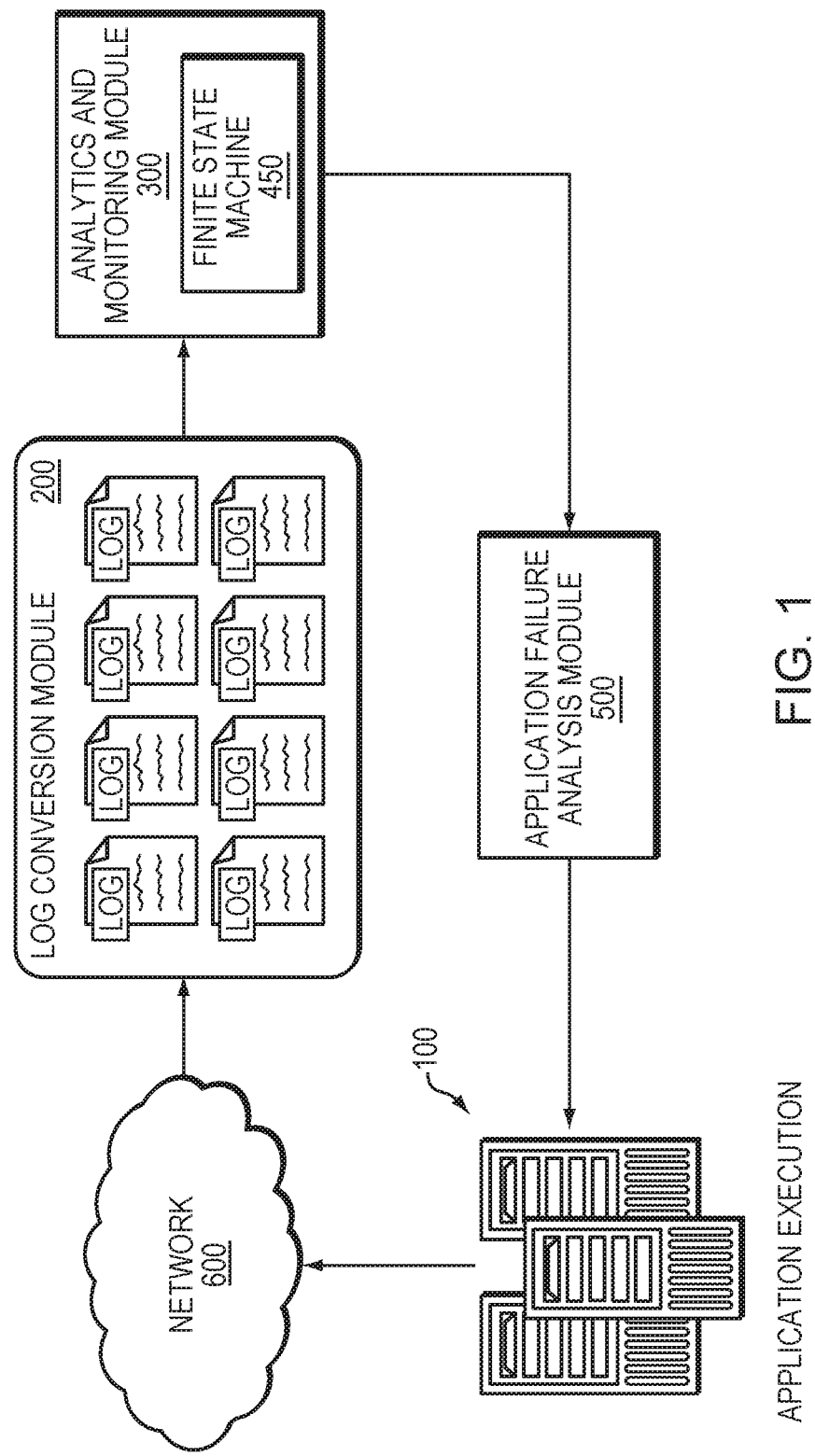
FIG. 1 is a simplified illustration illustrating processes that may be used in connection with techniques disclosed herein.

Described below is a technique for use in monitoring an application in a computing environment, which technique may be used to provide, among other things, representing execution of the application on a system as a finite state machine, wherein the finite state machine depicts at least one state of the application, wherein at least one state indicates at least one of successful application execution and unsuccessful application execution; identifying an error state within the finite state machine, wherein the error state indicates the unsuccessful application execution; identifying, by analyzing the finite state machine, a non-error state as a cause of the unsuccessful application execution, wherein the unsuccessful application execution is represented as a path comprising a plurality of states, wherein the path comprises the non-error state; and mapping the non-error state to a location in the application to identify the cause of the unsuccessful application execution.

Conventional technologies provide log data for troubleshooting errors that occur during application execution. Conventional technologies for log data for the execution of applications typically have a few rough guidelines that control the type of content that should be collected within the log data. These guidelines may vary from company to company, and may also be vague. In some conventional technologies, a developer may only collect content for log data that the developer determines would be helpful to debug the application in the future. Conventional technologies provide tools for parsing through log data, but typically only provide information once an error has occurred, and do not provide information as to the cause of the error. Log data can also be extremely large and cumbersome to search. The success of the searching may depend on the skill and experience of the developer performing the search.

Conventional technologies for monitoring the execution of an application trigger an alert reactively once an error has occurred, but do not provide a proactive alert at the stage in the execution of the application where the execution deviated from a successful execution to an execution path from which a successful execution is not possible.

Conventional technologies allow a developer to define metrics to monitor the execution of an application, but do not provide tools for monitoring the application behavior, and do not provide tools to detect when the application behavior deviates from a successful execution. Conventional technologies simply track metrics, and have to be updated as the code is updated.

Conventional technologies do not provide a logging framework that can scale as the code is modified and updated.

By contrast, in at least some implementations in accordance with the current technique as described herein, a standard for logging is defined. Log data is parsed into a logging framework that is then searched and translated into a finite state machine. An analytics and monitoring module identifies changes that occurred during each stage/state of the finite state machine, and calculates the probability of the application reaching completion given the application's current stage. The analytics and monitoring module identify the location in the finite state machine where the application execution deviated from a successful execution to an unsuccessful execution. From the identified location in the finite state machine, the application failure analysis module maps the identified location to a location in the application that is the cause of the error. The analytics and monitoring module monitors the health of the application in real-time and proactively addresses concerns.

Thus, the goal of the current technique is to provide a method and a system for providing a logging framework for log data, provide proactive support to identify an application error before it occurs, minimize the time it takes to identify and rectify an error, and monitor the health of the application in real-time.

In at least some implementations in accordance with the current technique described herein, the use of monitoring application in a computing environment can provide one or more of the following advantages: providing a standard for logging log data, monitoring application behavior in real time, detecting when the application behavior deviates from a successful execution, and proactively addressing application execution issues.

In contrast to conventional technologies, in at least some implementations in accordance with the current technique as described herein, a method monitors an application in a computing environment. The method represents execution of the application on a system as a finite state machine. The finite state machine depicts at least one state of the application, where the state indicates at least one of successful application execution and unsuccessful application execution. The method identifies an error state within the finite state machine, where the error state indicates the unsuccessful application execution. The method identifies, by analyzing the finite state machine, a non-error state as a cause of the unsuccessful application execution, where the unsuccessful application execution is represented as a path comprising a plurality of states, where the path comprises the non-error state. The method maps the non-error state to a location in the application to identify the cause of the unsuccessful application execution.

In an example embodiment of the current technique, the method predicts a failure rate of the execution of the application due to an issue identified at the location.

In an example embodiment of the current technique, when the method represents execution of the application as the finite state machine, the method translates log data from the execution of the application into the finite state machine.

In an example embodiment of the current technique, when the method translates log data from the execution of the application into the finite state machine, the method defines the log data to include at least one of a current state of the application, at least one timestamp associated with the current state, and at least one change occurring within the application within the current state.

In an example embodiment of the current technique, when the method identifies the error state within the finite state machine, the method identifies a failure of the execution of the application.

In an example embodiment of the current technique, when the method identifies, by analyzing the finite state machine, the non-error state as the cause of the unsuccessful application execution, the method identifies the non-error state as a state from which the successful application execution can avoid the unsuccessful application execution.

In an example embodiment of the current technique, the method identifies a second non-error state from which the successful application execution cannot avoid the unsuccessful application execution, where the path comprises the second non-error state, and where the second non-error state is subsequent to the non-error state. The method identifies the non-error state as a last location in the path where the successful application execution can avoid the unsuccessful application execution.

In an example embodiment of the current technique, each of the plurality of states comprises at least one of a total count attribute, a successful count attribute, and a success rate attribute.

In an example embodiment of the current technique, the non-error state is identified based the success rate attribute.

In an example embodiment of the current technique, the success rate attribute is compared to a threshold to identify the non-error state.

In an example embodiment of the current technique, the success rate attribute is updated in real time to monitor the health of the application.

FIG. 1 is a simplified illustration illustrating processes that may be used in connection with techniques disclosed herein. In an example embodiment, one or more applications execute on one or more computing systems 100. Execution of the application(s) produce log data. A log conversion module 200 translates the log data from the execution of the application into a finite state machine 450. In an example embodiment, the log conversion module 200 represents the execution of the application as a finite state machine 450. In an example embodiment, the log data may be collected on the computing system 100, and transmitted, for example, through a network 600, to the log conversion module 200. In another example embodiment, the log conversion module 200 may execute on the computing system 100. In an example embodiment, an analytics and monitoring module 300 analyzes the finite state machine 450 to identify a non-error state as a cause of an unsuccessful application execution. The application failure analysis module 500 maps the non-error state to a location in the application to identify the cause of the unsuccessful application execution.

Figure 2:
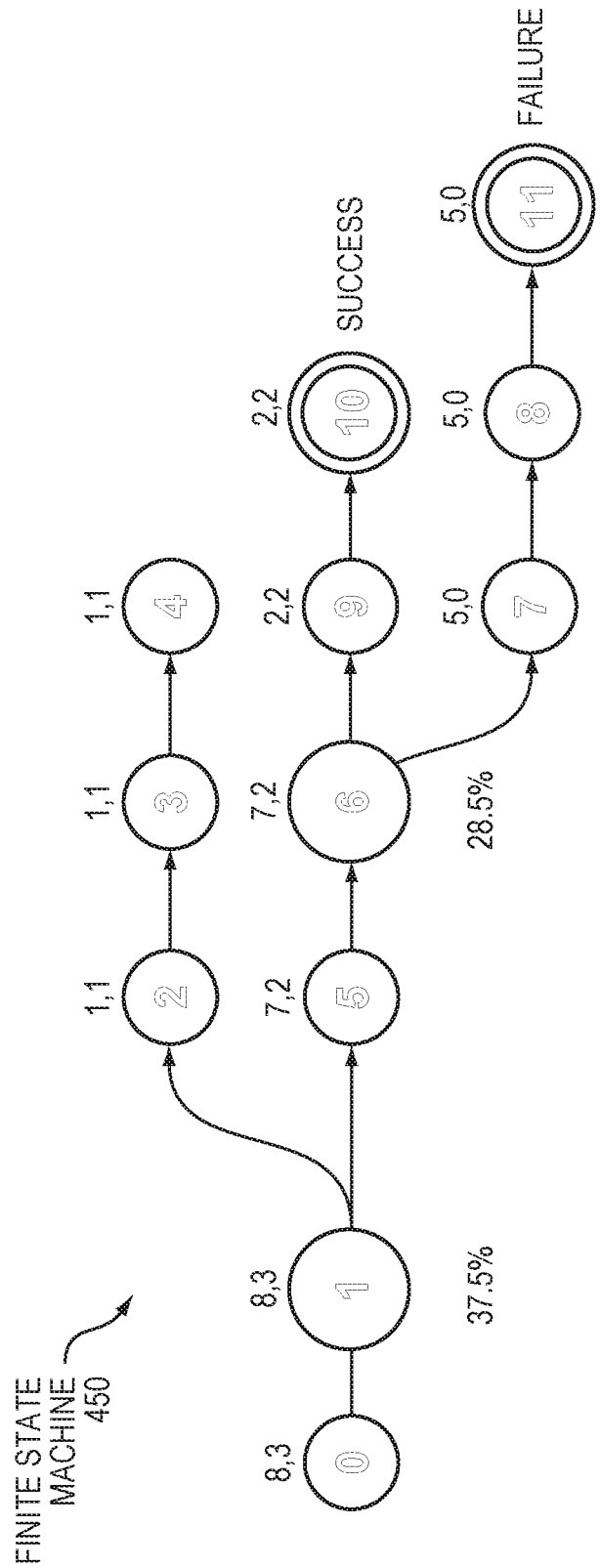
FIG. 2 is an illustration of a finite state machine that may be used in connection with techniques disclosed herein.

FIG. 2 is an illustration of a finite state machine 450, in accordance with an embodiment of the present disclosure. The finite state machine 450 illustrates the possible paths the application traverses during execution of the application. It should be noted that FIG. 2 is a simplified example for illustration purposes, and the execution of an application would typically have many, many paths.

The execution of the application begins at stage 0. This example illustration depicts three possible paths; 0-1-5-6-9-10 (a successful execution), 0-1-2-3-4, and 0-1-5-6-7-8-11 (an unsuccessful execution). The execution of the application results in a failed execution at stage 11. However, once the execution of the application reaches stage 7, the application cannot recover from the path to failure. It is at stage 6 where the deviation from a path to success deviates to the path of failure. Therefore, stage 6 is the "branch" in the application where the path to failure begins. It should be noted that the terms "state" and "stage" are used interchangeably.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 3:
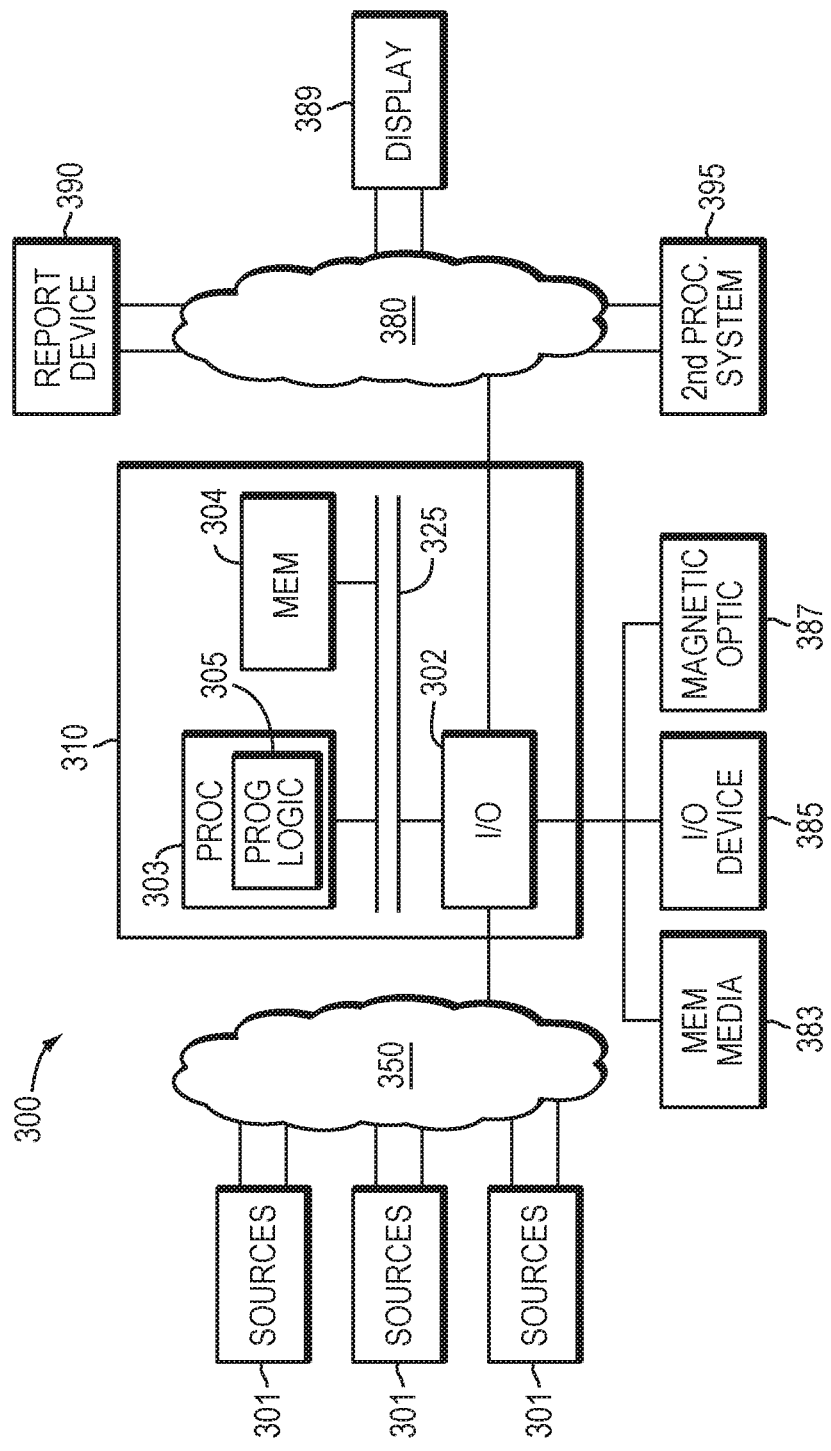
FIG. 3 is an example of an embodiment of an apparatus that may utilize the techniques described herein, in accordance with an embodiment of the present disclosure.

FIG. 3 is a block diagram illustrating an apparatus, such as a computer 310 in a network 300, which may utilize the techniques described herein according to an example embodiment of the present invention. The computer 310 may include one or more I/O ports 302, a processor 303, and memory 304, all of which may be connected by an interconnect 325, such as a bus. Processor 303 may include program logic 305. The I/O port 302 may provide connectivity to memory media 383, I/O devices 385, and drives 387, such as magnetic or optical drives. When the program code is loaded into memory 304 and executed by the computer 310, the machine becomes an apparatus for practicing the invention. When implemented on one or more general-purpose processors 303, the program code combines with such a processor to provide a unique apparatus that operates analogously to specific logic circuits. As such, a general purpose digital machine can be transformed into a special purpose digital machine.

Figure 4:
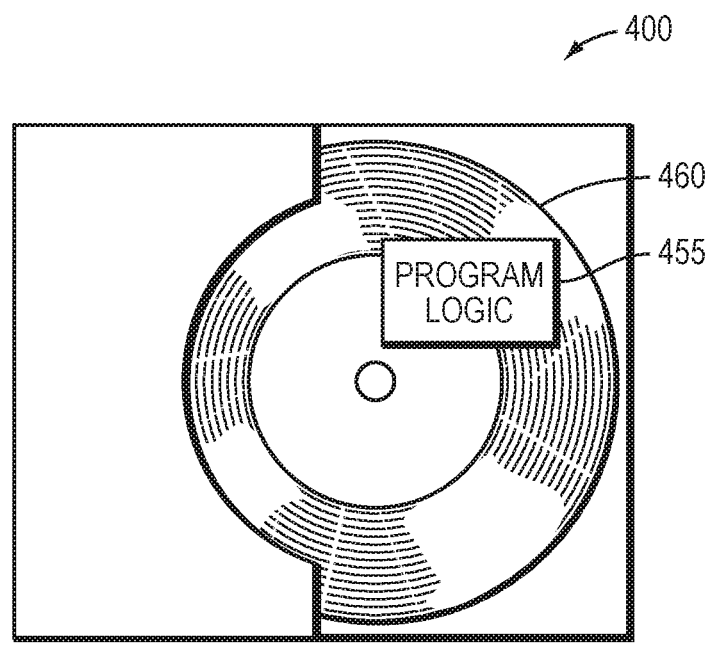
FIG. 4 is an example of a method embodied on a computer readable storage medium that may utilize the techniques described herein, in accordance with an embodiment of the present disclosure.

FIG. 4 is a block diagram illustrating a method embodied on a computer readable storage medium 460 that may utilize the techniques described herein according to an example embodiment of the present invention. FIG. 4 shows Program Logic 455 embodied on a computer-readable medium 460 as shown, and wherein the Logic is encoded in computer-executable code configured for carrying out the methods of this invention and thereby forming a Computer Program Product 400. Program Logic 455 may be the same logic 305 on memory 304 loaded on processor 303 in FIG. 3. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Figure 5:
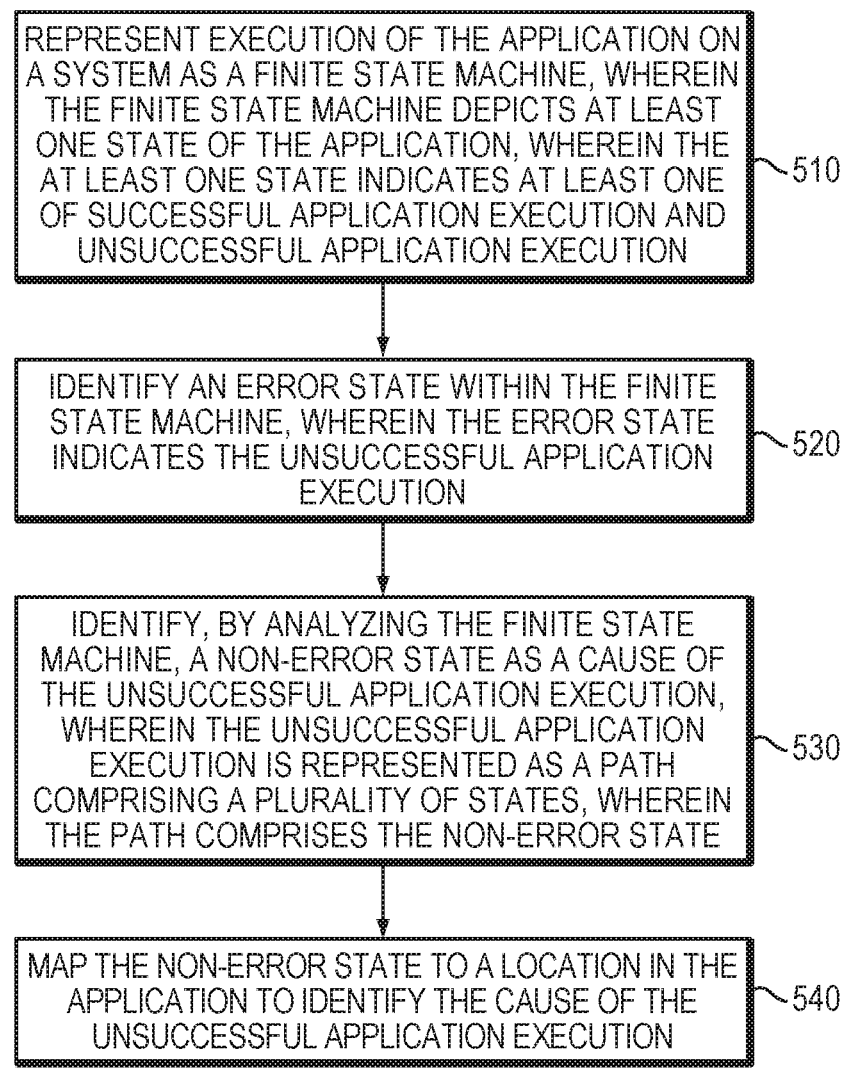
FIG. 5 is a flow diagram illustrating processes that may be used in connection with techniques disclosed herein.

Referring to FIG. 5, shown is a more detailed flow diagram illustrating monitoring an application in a computing environment. With reference also to FIGS. 1-4, the log conversion module 200 represents execution of the application on a system as a finite state machine 450. The finite state machine 450 depicts at least one state of the application, where the state indicates at least one of successful application execution and unsuccessful application execution (Step 510). In an example embodiment, the analytics and monitoring module 300, by default, assumes that every state leads to a successful application execution until the analytics and monitoring module 300 encounters a log data state that meets the criteria for an unsuccessful state. In an example embodiment, the criteria may be user defined.

In an example embodiment, when the log conversion module 200 represents execution of the application as the finite state machine 450, the log conversion module 200 searches and translates log data from the execution of the application into the finite state machine 450. In an example embodiment, the creation of the finite state machine 450 provides an entire history of application processing. In other words, the finite state machine 450 provides all the actions that took place that led to the current state of the application. The finite state machine 450 depicts all the possible paths that execution of the application may take. The possible paths include the paths that lead to successful application execution, and the paths that lead to unsuccessful application execution. The finite state machine 450 facilitates in identifying when the execution of the application deviated from a successful path to an unsuccessful path. This helps to identify when, during the execution of an application, the application may encounter an error, and thus, proactively take action. For example, in FIG. 2, an application that reaches stage 6 has a 28.5% change of completing successfully, whereas an application that transitions from stage 1 to stage 2 instead of transitioning to stage 5, has a 100% chance of completing successfully.

In an example embodiment, the log conversion module 200 filters the log data to a specific data time range. The log conversion module 200 then parses the log data and converts the log data to the finite state machine 450. In an example embodiment, as more and more log data files are utilized, the finite state machine 450 continues to grow, and several paths representing the execution of the application appear, as partially illustrated in FIG. 2. In an example embodiment, there may be many, many paths that represent the execution of the application. Some of the paths, such as path 0-1-5-6-9-10 illustrated in FIG. 2, result in the execution of the application completing as expected, while other, such as 0-1-5-6-7-8-11, can lead to errors, meaning the execution of the application completed unsuccessfully. The cause of an application execution error may be represented by paths that are executed less frequently, and therefore, may make it more difficult to reproduce and identify the cause of the application execution error using conventional technologies. In an example embodiment, the finite state machine 450 provides the changes that occur within the application along each path represented within the finite state machine 450, and these changes are utilized, by the analytics and monitoring module 300, to solve issues when issues are detected.

In an example embodiment, when the log conversion module 200 translates log data from the execution of the application into the finite state machine 450, a standard for logging defines the log data to include at least one of a current state of the application, at least one timestamp associated with the current state, and at least one change occurring within the application within the current state. In an example embodiment, the timestamp is associated with the application execution at the time of the current state.

In an example embodiment, a logging framework is defined, and rules are defined for the content to be logged. In an example embodiment, the logging framework may be an Extensible Markup Language (XML) formatted design. In an example embodiment, the logging framework may be as follows:

```
<L T="Info" D="11/02/2017 12:29:39.460 I="0"
AID ="00000000-0000-0000-000000000000">
    <FC>
        <F LV="0">Project.Namespace.Class</F>
        <F LV="1">Method</F>
        <F LV="2">Logical Block of Code</F>
    </FC>
    <DC>
        <D Key="Variable Name">Current Value of Variable</D>
        <D Key="Variable Name">Current Value of Vairable</D>
    </DC>
    <MC>
        Logical Section of Code that is completed
    </MC>
</L>
```

A single log is enclosed in <L></L> tags. In an example embodiment, the <L> tag has multiple attributes which constitute elements of a log level, for example, "Debug", "Info", "Warn", "Error", etc., and is represented by the "T". The timestamp is represented by "D", and the activity ID is represented by "AID". In an example embodiment, more attributes may also be included at this level (<L></L>) of the logging framework. The "Flow Content" section of the logging framework is denoted by the "<FC></FC>" tags. The location in the code where the log is generated from is logged in the "FC" section. The "FC" section has sub-divisions <F LV="0">, <FLV="1">, etc. Each sub-division, or level, in the "FC" section identifies a location from where the log was generated. For example, <FLV="0"> indicates a namespace/project/class, while <FLV="1"> indicates a method. In an example embodiment, more levels may be added to, for example, focus on a specific location within the code of the application. The "Data Context" section of the logging framework is denoted by the "<DC></DC>" tags. The "DC" tags contain, for example, variables whose values were changed, or new variables that were added during the transition from the current state to the next state. Each variable in the "Data Context" section is enclosed within the "<D></D>" tags. In an example embodiment, the "<D></D>" tags have an attribute indicating the name of the variable, for example, "<D Key=" CustomerNumber"></D>. The "Message Context" section of the logging framework is denoted by the "<MC></MC>" tags. In an example embodiment, the "<MC></MC>" tags contain a specific message that helps describe the transition that will take place from the current state to the next state (i.e., the next stage in the path). Thus, in an example embodiment, log data would identify the state that an application is currently in (using the "Flow Context" section), and the transition (using the "Message Context" section and the "Data Context" section) that caused the application to reach that state. In an example embodiment, the logging framework assists in the creation of the finite state machine 450, and also assists in understanding the changes that were made during the execution of the application.

In an example embodiment, when an error occurs at a particular time, the analytics and monitoring module 300 collects the log data that was produced around that time to better understand why the issue occurred. The analytics and monitoring module 300 searches and filters the log data to the specific date and time range. The analytics and monitoring module 300 then parses through the log data and create the finite state machine 450. An example of log data in the logging framework is provided below:

```
<L T="Info" D="11/02/2017 12:29:39.460 I="0"
AID ="00000000-0000-0000-000000000000">
    <FC>
        <F LV="0">Project1.Namespace1.Class1</F>
        <F LV="1">Method1</F>
        <F LV="2">Block1</F>
    <MC>
        Validation API called with values - 120, 21/02/02
    </MC>
</L>
<L T="Info" D="11/02/2017 12:29:39.460 I="0"
AID ="00000000-0000-0000-000000000000">
    <FC>
        <F LV="0">Project1.Namespace1.Class1</F>
        <F LV="1">Method1</F>
        <F LV="2">Block1</F>
    <MC>
        Validation API returned an error
    </MC>
</L>
```

In an example embodiment, the "Flow Context" section defines the state using the content across levels. The states that may be defined are "NameSpace1.Component1-Method1-Block1" and "NameSpace1.Component1-Method1-Block2". In an example embodiment, the message and data values are used to define a transition. In this example embodiment, the transitions are "Validation API called with values—120, 21/02/02" and "Validation API returned an error". The date time of the log data, represented by the "D" attribute within the "<L></L>" tags assists in defining the sequence of the states. The remaining attributes within the "<L></L>" tags may provide additional information for defining the states.

In an example embodiment, the analytics and monitoring module 300 identifies an error state within the finite state machine, where the error state indicates the unsuccessful application execution (Step 520). In an example embodiment, when the analytics and monitoring module 300 identifies the error state within the finite state machine, the analytics and monitoring module 300 identifies a failure of the execution of the application. In an example embodiment, the criteria for the failure may be defined by a user. For example, in FIG. 2, stage 11 is the error state, indicating the execution of the application failed.

In an example embodiment, the analytics and monitoring module 300 identifies, by analyzing the finite state machine, a non-error state as a cause of the unsuccessful application execution, where the unsuccessful application execution is represented as a path comprising a plurality of states, where the path comprises the non-error state (Step 530). In an example embodiment, when the analytics and monitoring module 300 identifies, by analyzing the finite state machine 450, the non-error state as the cause of the unsuccessful application execution, the analytics and monitoring module 300 identifies the non-error state as a state from which the successful application execution can avoid the unsuccessful application execution. For example, as illustrated in FIG. 2, stage/state 6 is the state from which the successful application execution can avoid the unsuccessful application execution of path 0-1-5-6-7-8-11, and instead follow the success application execution of path 0-1-5-6-8-10.

In an example embodiment, the analytics and monitoring module 300 identifies a second non-error state from which the successful application execution cannot avoid the unsuccessful application execution. The path comprises the second non-error state, and the second non-error state is subsequent to the non-error state. The analytics and monitoring module 300 identifies the non-error state as a last location in the path where the successful application execution can avoid the unsuccessful application execution. As illustrated in FIG. 2, stage/state 7 is the second non-error state from which the successful application execution cannot avoid the unsuccessful application execution. Stage/state 6 is the last location in the path where the successful application execution can avoid the unsuccessful application execution.

The application failure analysis module 500 maps the non-error state to a location in the application to identify the cause of the unsuccessful application execution. (Step 540). In an example embodiment, the analytics and monitoring module 300 predicts a failure rate of the execution of the application due to an issue identified at the location. In an example embodiment, each of the plurality of states comprises at least one of a total count attribute, a successful count attribute, and a success rate attribute. The total count attribute is the number of times that stage has been "reached". In other words, the total count attribute is the number of times the execution of the application has led the application to move to that stage. The successful count attribute is the number of transitions starting from the current stage that eventually ends at a final successful stage. The success rate is the successful count attribute divided by the total count attribute. For example, FIG. 2 illustrates a finite state machine 450 where stage 0 has been reached a total of 8 times with 3 of those times resulting in successful execution of the application, resulting in a 37.5% success rate. Stage 1 has also been reached a total of 8 times with 3 of those times resulting in successful execution of the application, also a 37.5% success rate. Stage 2 has been reached 1 time, with 1 time resulting in successful execution of the application, as have been stages 3, and 4, resulting in a 100% success rate. Stages 5 and 6 have been reached 7 times with 2 of those times resulting in successful execution of the application, resulting in a 28.5% success rate. Stages 9 and 10 have been reached 2 times with both of those times resulting in successful execution of the application, a 100% success rate. Stages 7, 8, and 11 have been reached 5 times with 0 times resulting in successful execution of the application, a 0% success rate. In an example embodiment, the total count attribute also assists in identifying which paths are traversed the most during the execution of the application, and which paths are bottlenecks. In an example embodiment, as the application executes, the analytics and monitoring module 300 increments both values for example, (2,2), however, if an error is encountered, the analytics and monitoring module 300 decrements the second value, for example, (2,1). In an example embodiment, the analytics and monitoring module 300 decrements the second value for the current state, for example, decrementing (2,2) to (2,1), and also decrements the second value for each of the "parent" states along the path of the current state. For example, when a failure is detected at stage 11, the second value for each of stages 0, 1, 5, 6, 7, 8, and 11 are decremented, since error could have happened anywhere in the path from the start (stage 0) to the error state (stage 11).

In an example embodiment, the non-error state is identified based on the success rate attribute. In an example embodiment, the success rate attribute is compared to a threshold to identify the non-error state. In an example embodiment, the analytics and monitoring module 300 examines the success rate of adjacent stages in the finite state machine 450. For example, as illustrated in FIG. 2, the analytics and monitoring module 300 examines the success rate of stages 5, 6, and 7. The success rate each for stages 5 and 6 is 28.5%. The success rate of stage 7 is 0%. Assume the threshold is 25%. During the transition from stage 6 to stage 7, the success rate drops from 28.5% to 0%, and therefore, falls below the threshold of 25%. Therefore, the analytics and monitoring module 300 identifies stage 6 as the non-error state. In an example embodiment, once the analytics and monitoring module 300 identifies a stage with a success rate below the threshold, the analytics and monitoring module 300 compares the success rate of all the "child" stages (of the stage identified as having a success rate below the threshold) with the threshold to identify the non-error state. When the analytics and monitoring module 300 identifies a first child stage that has a success rate above the threshold, and a second child stage that has a success rate below the threshold, the analytics and monitoring module 300 identifies the parent stage of the first child stage and the second child stage as the non-error state. For example, the analytics and monitoring module 300 identifies stage 6 as the non-error state (for example, once the success rate of stage 6 drops below the threshold) by comparing the success rate of stages 7 and 9 with the threshold. The success rate of stage 9 is above the threshold, and the success rate of stage 7 is below the threshold. Therefore, the analytics and monitoring module 300 identifies stage 6 (i.e., the parent stage of both child stages 7 and 9) as the non-error state.

In an example embodiment, a threshold may be identified, such that if the success rate attribute crosses the threshold, an alert is triggered to notify users of the application. Thus, the alert is triggered before the application actually reaches an error state. This allows developers to intervene as soon as possible, and rectify the problem with the least amount of impact. Instead of responding to the error after the error occurs, the developer can respond to the issue before the error occurs. In an example embodiment, the developer is notified of the location of the non-error state which reduces the amount of time it takes the developer to identify the location or root cause of the error. Embodiments disclosed herein provide a combination of proactively identifying errors before they occur, and identifying a location associated with the error. Thus, embodiments disclosed herein proactively address application execution issues instead of reacting to the issues.

In an example embodiment, the analytics and monitoring module 300 analyzes and monitors the changes that occur during each state of each path in the finite state machine 450, and calculates a probability of the application execution achieving successful completion, based on the application's current state along a given path in the finite state machine 450. In an example embodiment, the success rate attribute is updated in real time to monitor the health of the application. In an example embodiment, the probability of successful completion of the execution of the application, calculated by the analytics and monitoring module 300, provides monitoring of the health of the application in real-time, and proactively addresses concerns about the execution of the application. The probability of successful completion of the execution of the application provides information as to where the application deviated from the expected behavior, and what the differences in the application were between the expected behavior and unexpected behavior of the execution of the application. In an example embodiment, when a new log entry causes a transition to a stage where the success rate is lower than the threshold, the analytics and monitoring module 300 sends out an alert to notify users of a potential problem. This allows users to proactively act to rectify the problem. Additionally, the finite state machine 450 provides information associated with the reasons why an application transitioned from one stage to the other, and represents the differences why and when the application completed processing successfully versus when the application completed processing unsuccessfully. The analytics and monitoring module 300 also assists in narrowing down to a point in the execution where the application transitioned to a path from which it could not successfully complete (for example, in FIG. 2, from stage 6 to stage 7).

There are several advantages to embodiments disclosed herein. Embodiments disclosed herein provide a standard for logging log data. The analytics and monitoring module monitors application behavior in real time. The analytics and monitoring module detects when the application behavior deviates from a successful execution, and proactively addresses application execution issues.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of monitoring an application, the method comprising:
   representing execution of the application on a system as a finite state machine, wherein the finite state machine depicts at least one state of the application, wherein the at least one state indicates at least one of successful application execution and unsuccessful application execution;
   identifying an error state within the finite state machine, wherein the error state indicates the unsuccessful application execution;
   identifying, by analyzing the finite state machine, a non-error state as a cause of the unsuccessful application execution, wherein the unsuccessful application execution is represented as a path comprising a plurality of states, wherein the path comprises the non-error state;
   identifying the non-error state as a last location in the path where the successful application execution can avoid the unsuccessful application execution; and
   mapping the non-error state to a location in the application to identify the cause of the unsuccessful application execution.

2. The method of claim 1, further comprising:
   predicting a failure rate of the execution of the application due to an issue identified at the location.

3. The method of claim 1, wherein representing execution of the application as the finite state machine comprises:
   translating log data from the execution of the application into the finite state machine.

4. The method of claim 3, wherein translating log data from the execution of the application into the finite state machine comprises:
   defining the log data to include at least one of a current state of the application, at least one timestamp associated with the current state, and at least one change occurring within the application within the current state.

5. The method of claim 1, wherein identifying the error state within the finite state machine comprises:
   identifying a failure of the execution of the application.

6. The method of claim 1, wherein identifying, by analyzing the finite state machine, the non-error state as the cause of the unsuccessful application execution comprises:
   identifying the non-error state as a state from which the successful application execution can avoid the unsuccessful application execution.

7. The method of claim 6, further comprising:
identifying a second non-error state from which the successful application execution cannot avoid the unsuccessful application execution, wherein the path comprises the second non-error state, and wherein the second non-error state is subsequent to the non-error state.

8. The method of claim 1, wherein each of the plurality of states comprises at least one of a total count attribute, a successful count attribute, and a success rate attribute.

9. The method of claim 8, wherein the non-error state is identified based on the success rate attribute.

10. The method of claim 9, wherein the success rate attribute is compared to a threshold to identify the non-error state.

11. The method of claim 8, wherein the success rate attribute is updated in real time to monitor the health of the application.

12. A system for use in monitoring an application, the system comprising a processor configured to:
represent execution of the application on a system as a finite state machine, wherein the finite state machine depicts at least one state of the application, wherein the at least one state indicates at least one of successful application execution and unsuccessful application execution;
identify an error state within the finite state machine, wherein the error state indicates the unsuccessful application execution;
identify, by analyzing the finite state machine, a non-error state as a cause of the unsuccessful application execution, wherein the unsuccessful application execution is represented as a path comprising a plurality of states, wherein the path comprises the non-error state;
identifying the non-error state as a last location in the path where the successful application execution can avoid the unsuccessful application execution; and
map the non-error state to a location in the application to identify the cause of the unsuccessful application execution.

13. The system of claim 12, further configured to:
predict a failure rate of the execution of the application due to an issue identified at the location.

14. The system of claim 12, wherein the processor configured to represent execution of the application as the finite state machine is further configured to:
translate log data from the execution of the application into the finite state machine.

15. The system of claim 14, wherein the processor configured to translate log data from the execution of the application into the finite state machine is further configured to:
define the log data to include at least one of a current state of the application, at least one timestamp associated with the current state, and at least one change occurring within the application within the current state.

16. The system of claim 12, wherein the processor configured to identify, by analyzing the finite state machine, the non-error state as the cause of the unsuccessful application execution is further configured to:
identify the non-error state as a state from which the successful application execution can avoid the unsuccessful application execution.

17. The system of claim 16, further configured to:
identify a second non-error state from which the successful application execution cannot avoid the unsuccessful application execution, wherein the path comprises the second non-error state, and wherein the second non-error state is subsequent to the non-error state.

18. The system of claim 12, wherein each of the plurality of states comprises at least one of a total count attribute, a successful count attribute, and a success rate attribute.

19. The system of claim 18, wherein the non-error state is identified based on the success rate attribute.

20. A computer program product for monitoring an application, the computer program product comprising:
a computer readable storage medium having computer executable program code
embodied therewith, the program code executable by a computer processor to:
represent execution of the application on a system as a finite state machine, wherein the finite state machine depicts at least one state of the application, wherein the at least one state indicates at least one of successful application execution and unsuccessful application execution;
identify an error state within the finite state machine, wherein the error state indicates the unsuccessful application execution;
identify, by analyzing the finite state machine, a non-error state as a cause of the unsuccessful application execution, wherein the unsuccessful application execution is represented as a path comprising a plurality of states, wherein the path comprises the non-error state;
identifying the non-error state as a last location in the path where the successful application execution can avoid the unsuccessful application execution; and
map the non-error state to a location in the application to identify the cause of the unsuccessful application execution.

* * * * *